June 11, 1968  H. E. MILLER ET AL  3,387,839
ADHESIVE BONDED BUSHING AND METHOD OF MAKING SAME
Filed Dec. 11, 1964

INVENTORS
HARVEY E. MILLER
ARTHUR MUNDY
BY
ATTORNEYS

United States Patent Office 3,387,839
Patented June 11, 1968

3,387,839
ADHESIVE BONDED BUSHING AND METHOD OF MAKING SAME
Harvey E. Miller, Logansport, and Arthur Mundy, Lucerne, Ind., assignors to The General Tire & Rubber Company, a corporation of Ohio
Filed Dec. 11, 1964, Ser. No. 417,542
11 Claims. (Cl. 267—57.1)

ABSTRACT OF THE DISCLOSURE

Resilient bushings composed of an elastomeric insert radially compressed between a pair of annular sleeves are improved by bonding the insert to the sleeve utilizing a two-layer adhesive. The first layer, in contact with each sleeve, contains a halogenated, preferably a chlorinated, rubber compound and the second layer, in contact with the elastomeric insert, contains an organic diisocyanate and a halogenated nitrile rubber such as chlorinated acrylonitrile.

It has become a well-established custom in recent years to use bushings of the general type described herein in a wide variety of applications including torsional joints, pivotal connections, vibration and sound absorbing mountings, and isolators. Typically the construction of such a bushing consists of concentric tubular sleeves, preferably metal, separated by a resilient elastomeric insert, which insert permits relative rotational, radial or axial movement between said two sleeves.

In some instances the elastomeric insert is held in radial compression between the tubular metal sleeves, the force of compression serving to resist slippage between the insert and the sleeves and to increase the radial load sustaining characteristics of the bushing. Such a bushing performs satisfactorily so long as operational conditions are not particularly severe and are limited to radial deflection. However, the compressive forces between the insert and the sleeves are not sufficient to prevent slipping when the bushing is subjected to large torsional or axial deflection.

To alleviate this problem, it has been attempted to assemble bushings utilizing an uncured elastomeric insert which is compressibly restrained between the outer and inner metal sleeves after which the bushing is heated to vulcanize the insert and to bond it to said sleeves. Unfortunately, however, vulcanizing the insert in situ tends to at least partially relieve the compressive forces within the insert, thereby negating some of the advantages provided by compressibly restraining the insert.

More recently, bushings have been assembled utilizing an adhesive to bond a compressed cured elastomeric insert to the contacting faces of the metal sleeves. Usually it has been found necessary to utilize a lubricant to assemble these bushings, said lubricant tending to have an adverse effect upon the bonding properties of the adhesive agent. In utilizing an adhesive which itself has favorable lubricating properties, the selection of adhesives is somewhat limited, thereby rendering it difficult to use an adhesive having optimum bonding properties. Where it is attempted to assemble the bushing without a lubricant, and the adhesive is not possessed of good lubricating properties, the frictional engagement of the contacting faces in compressibly assembling the elastomeric insert into the sleeves results in uneven distribution of the compressive forces within the insert. When any of these bushings are subjected to axial or torsional loading, the relative movement of the sleeves and resultant deformation of the insert serves to relieve the compressive load on the insert itself and to transmit the deformation stresses to the adhesive layer between the insert and the sleeves. Because of the failure to utilize the optimum properties of the adhesive in this type of bushing, bonding failures are common.

It is an object of this invention to provide a bushing having bond characteristics far superior to those previously obtained.

Another object is to provide a bushing, and a method of assembling the same, wherein the elastomer to metal bond is at least as strong as the internal strength of the elastomer itself.

Still another object is to provide a means for assembling a bushing utilizing a suitable lubricant wherein said lubricant does not have an adverse effect on the bond between the elastomer and the metal parts.

Still another object is to provide a bushing particularly well adapted for high axial and/or torsional loading.

Yet another object of this invention is to provide a means for assembling a bushing having a plurality of concentric, spaced apart rigid sleeves and an elastomeric insert compressibly retained between each of the adjacent sleeves, said method comprising applying a first layer of a halogenated rubber to the bonding surfaces of the sleeves, applying a second layer to the sleeves, said second layer comprising an adhesive containing a diisocyanate and a halogenated nitrile rubber, assembling the bushing utilizing a suitable lubricant, and heating the bushing to form a strong adhesive bond between each of the inserts and the adjacent sleeves.

These and other objects will become readily apparent in light of the following discussion and drawings in which.

Figure 1:
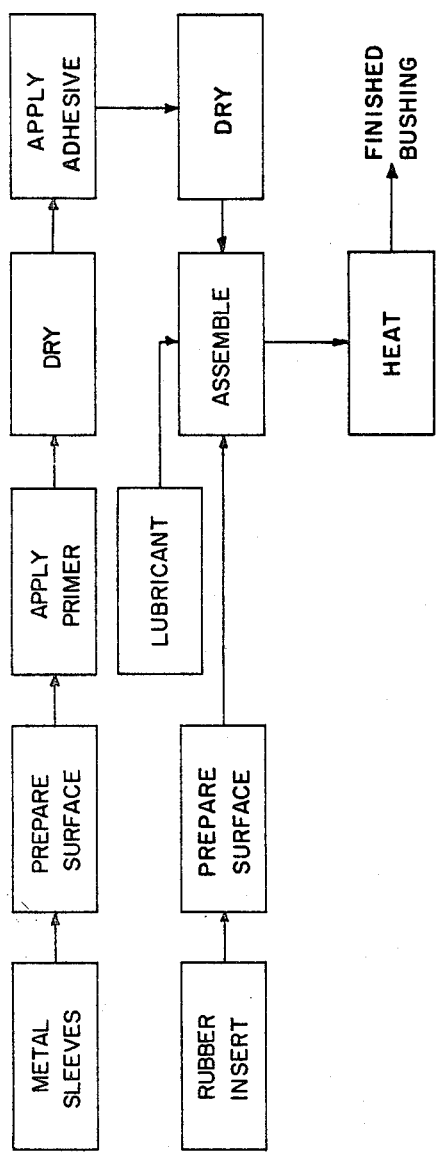
FIG. 1 shows a block diagram for the fabrication of a bushing according to the teachings of the invention.

Referring now to FIG. 1, it can be seen that the metal sleeves and rubber insert or inserts are separately treated to prepare the respective surfaces thereof for assembling and bonding. The surfaces of the metal sleeves to be bonded to the elastomer are first cleaned very thoroughly prior to applying a primer thereto. There are numerous methods which can be utilized in the preparation of these surfaces, but for purposes of illustration they may be sand blasted and thereafter degreased. A primer coat, consisting of a halogenated rubber and various fillers dissolved and dispersed in a suitable carrier, is then applied to the sleeves by any suitable means such as spraying, dipping, or painting, after which the primer is dried.

Drying of the metal sleeves after the application of the primer is accomplished by evaporating the carrier, generally a solvent, therefrom. This can be done by exposing the sleeves to room temperature, or preferably by heating the sleeves to an elevated temperature of not more than 180° F. for a short length of time to evaporate the carrier and thereby dry the primer. After the primer is dry, an adhesive layer is then applied to the sleeves, the preferred adhesive containing a halogenated nitrile rubber, a diisocyanate, and various fillers dispersed or dissolved in a suitable carrier. This layer can likewise be applied by any suitable means such as spraying, dipping, or painting. After the adhesive is applied, the sleeves are again dried to produce a non-tacky surface, which drying can be facilitated by heating to an elevated temperature. The sleeves can then be readily handled without danger of removing or abrading the primer and adhesive therefrom.

The elastomeric insert, generally formed by injection molding or the like, is preferably given a surface treatment consisting of an alkaline detergent wash which serves to remove material or film from the surface thereof, the presence of which would tend to have a harmful effect upon the adhesive bond with the sleeve. The insert is then thoroughly dried.

Because the surface of the insert and the mating surfaces of the metal sleeves are dry prior to assembly, a suitable lubricating oil is preferably applied to one or both of the surfaces to facilitate the assembly of the bushing. The metal sleeves and rubber insert are then assembled into a bushing, utilizing fabrication techniques well known in the industry; for example, as shown and described in U.S. 2,572,215 entitled "Bushing and Method of Making Same" which patent is owned by the assignee of the present invention.

After assembly it is preferable to wait for several hours prior to forming the bond to permit most of the lubricant to be expelled from between the insert and the sleeves, and to be absorbed into the body of the insert.

The surface between the insert and the sleeves is then heated to a temperature of preferably between about 260° and 300° F. for a sufficient length of time to activate the adhesive and bond the parts together. When utilizing a forced air circulating furnace, a heating time of between one and one-half and three hours at the above-mentioned temperatures has been found suitable for this purpose. Other heating means such as immersion of the bushing into a molten salt bath, induction or dielectric heating can be used for bonding in which case much shorter heating times are generally required.

Figure 2:
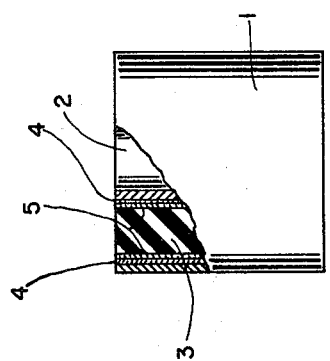
FIG. 2 represents a simple bushing partially in cross section containing an elastomeric insert compressibly disposed between two concentric metal sleeves.

Referring now to FIG. 2, there is shown a bushing of relatively simple construction comprising an outer metal sleeve 1 an inner metal sleeve 2 and an elastomeric insert 3 compressibly restrained therebetween. Disposed on the inner surface of the outer sleeve 1 and the outer surface of the inner sleeve 2 is a primer layer 4 consisting predominantly of a mixture of halogenated rubber and fillers. Disposed between the primer layer and the surface of the elastomeric insert 3 is an adhesive layer 5, said adhesive layer containing a halogenated nitrile rubber, a diisocyanate, and various fillers. As above stated, a strong bond is formed between the insert 3 and the outer and inner tubular sleeves through the adhesive and primer layers upon heating of the assembled bushing.

It should be understood that the bushing of the type shown in FIGURE 2 may be assembled with the insert bonded to only one of the sleeves instead of both, for use in applications where slipping is not a problem or is desired or permissible between the insert and one of the sleeves but not the other.

Figure 3:
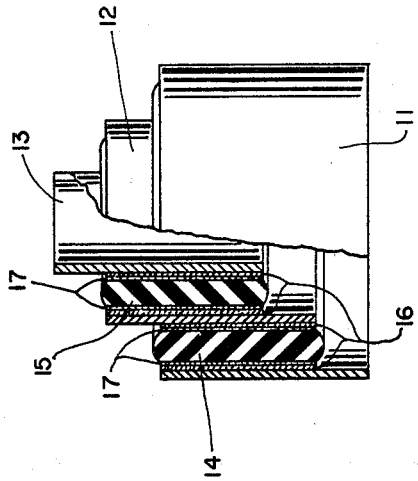
FIG. 3 shows a duplex bushing partially in cross section, wherein two resilient inserts are compressibly restrained in axially displaced relationship to one another between three concentric tubular metal sleeves.

Referring now to FIGURE 3, there is shown a bushing of the duplex type that has been found to perform very satisfactorily under conditions of heavy axial loading. The bushing consists of three metal sleeves, an outer sleeve 11, middle sleeve 12, and an inner sleeve 13. Compressibly disposed between the outer sleeve 11 and the middle sleeve 12 is an elastomeric insert 14, and likewise compressibly restrained between the middle sleeve 12 and the inner sleeve 13 is a similar insert 15. The surface of the sleeves in contact with the elastomeric inserts is coated with a suitable primer 16, and disposed over the primer layer is a layer of adhesive material 17 in contact with the elastomeric inserts.

One method of assembling a bushing of the type shown in FIGURE 3 is to coat the surfaces of the metal sleeves with a suitable primer dispersed and dissolved in a suitable liquid carrier, followed by heating to evaporate the carrier and to dry the primer. A second coating, comprising an adhesive in a suitable carrier, is then applied over the primer layer after which the sleeves are again heated to dry the adhesive. Prior to assembly the surfaces of the inserts are cleaned and dried. Utilizing a suitable lubricant such as a non-drying mineral oil, the insert 14 is urged into outer sleeve 11, and in a separate operation, the inner sleeve 13, inner insert 15, and the middle sleeve 12 are assembled. Thereafter the two separate assemblies are united to make the composite structure which is then heated in, for instance, a circulating air furnace for about two and one-half hours at 285° F. to bond the components together.

Bushings of the duplex type have been found to be very suitable in applications employing high axial loads such as springs for heavy trucks and the like. When used as a spring, the bushing is mounted in the vertical position with the inner sleeve 13 connected to the body of the truck and the outer sleeve 11 attached to the unsprung part of the truck, i.e. wheels and axle. When the truck is empty, the weight of the truck on the bushing causes relative axial movement of the inner sleeve 13 and the middle sleeve 12 thereby resulting in compressive and shear deformation primarily of the inner elastomeric insert 15. However, when the truck is heavily loaded, the additional weight causes relative movement between the middle sleeve 12 and the outer sleeve 11 in addition to the above-described movement thereby resulting in shear deformation of both inserts. The bushing, when assembled according to the teachings of the invention, has a bond strength sufficiently great to prevent slipping or bond failure between the relative components of the bushing even under these heavy axial loads.

It has been found that for applications of the type described herein, the insert is preferably molded from natural rubber. However, there are many other elastomers which can be substituted for natural rubber, some of these being butyl rubber, neoprene, ethylene propylene terpolymer, and SBR (styrene butadiene rubber).

A typical natural rubber formulation utilized in the production of bushing inserts comprises the following:

| | Parts by weight |
|---|---|
| Smoked sheet | 75 |
| Amber crepe | 25 |
| Zinc oxide | 3 |
| Channel black | 45 |
| Luric acid | 1.5 |
| Retarder | .4 |
| Sodium acetate | .4 |
| Antioxidant | 1.0 |
| Sulfur | 2.75 |
| Accelerator | 1.4 |
| Vulcanization aid | .2 |

This formulation is processed by milling and extruding and is then formed into inserts of the desired shape by injection molding or the like. The molded inserts are then cured at elevated temperatures of, e.g., 320° F. for 10 to 30 minutes according to well-established practices.

As mentioned before, the primer used as a coating over the metal sleeves of the bushing is composed of a halogenated rubber compound and various fillers. The halogenated rubber is preferably a chlorinated rubber. Although there are a number of carriers that can be used for the primer, one that is particularly suitable for this purpose is an ether-ketone solvent mixture. Ethylene glycol monoethyl ether is a preferred ether while methyl isobutyl ketone is a suitable ketone. The solids content in the carrier will depend primarily upon the manner in which the primer is to be applied to the metal and can generally range from between 5 percent (for spraying) to about 30 percent (where it is to be applied by a brush or by dipping). The chlorinated rubber comprises about 50 to 80 percent of the weight of the solids content of the primer, the remainder being made up of various pigments and fillers, such as $TiO_2$ and clay, used to maintain suitable dispersion of the primer in the carrier and to facilitate coating of the metal parts by the primer.

As previously stated, the preferred adhesive in this invention consists of a mixture of diisocyanate and a halogenated nitrile rubber along with fillers dissolved and dispersed in a suitable carrier system. Here again the solids content of the adhesive can vary widely depending on the mode of application to the insert and can vary from about 5 percent to about 25 percent. Although a number of diisocyanates can be used in the adhesive, a benzidine diisocyanate, and more particularly a dialkoxy substituted benzidene diisocyanate, is preferred. A specific example of the latter is 3,3'-dimethoxy benzidine diisocyanate. Chlorinated acrylonitrile rubber is the preferred halogenated nitrile rubber in this adhesive. The filler may contain carbon black as well as other ingredients such pumice. The ratio of the diisocyanate to the nitrile rubber is preferably between 1:5 and 1:10, and combined, they account for between 50 and 75 percent by weight of the solids content of the adhesive.

Any carrier may be used in which the ingredients of the adhesive, or at least a part thereof, are dissolved; it being preferred that the carrier be readily volatile so that upon application of the adhesive over the primer layer the adhesive may be readily dried. Although various chlorinated hydrocarbons and ketones can be used as solvents, a particularly suitable solvent consists of a mixture of trichloroethylene and xylene.

A bushing, when fabricated according to the teachings of this invention, has been found, under test conditions of axial loading, to have a bond strength which is greater than the shear strength of the elastomer itself. Therefore, values of optimum bond strength are not readily available inasmuch as premature failure of the insert occurs before the maximum stress on the bond is reached. It is apparent from this, however, that the invention teaches a method of eliminating elastomer to metal bond separation as a cause of operational failure of bushings.

A detailed explanation of the mechanics of adhesion of elastomer to metal is impractical at this point inasmuch as many fo the contributing factors are not thoroughly understood. Before such a discussion can be undertaken, various properties of the elastomer such as interfacial compatability, electrical polarity, and wettability by various liquids as well as the compounding and processing history of the elastomer must be thoroughly understood. Furthermore, the type of metal to be used in the sleeves as well as the surface preparation must be evaluated. Add to these the various properties of the primer and adhesive such as chain length, types of solvents, reactive groups and polar orientation, and it can be seen that to treat the subject adequately would require an extensive and prolonged discussion. It appears, however, that the halogenated rubber contained in the metal primer, being highly polar, forms a strong bond with the metal, and the diisocyanate and halogenated nitrile rubber in the adhesive form a strong linking bond between the elastomeric insert and the primer layer. Suffice it to say that the novel bushing and method described herein results in a product having properties far superior to those of previously known bushings.

It is obvious that the bushings assembled according to the teachings of this invention utilizing the adhesive-primer combinations as hereinabove described can be used for purposes other than resilient springs on vehicles. In fact, they can be used in any standard bushing application wherein bonded bushings are presently utilized, and are especially well adapted for uses wherein the bushing is subjected to large axial or torsional forces. Isolation mounts and axial mounts are but a few of the possible applications.

The two component adhesive system can also be used in the fabrication of so-called dual rate or variable rate bushings in which one of the contacting surfaces of the insert is relieved or channeled so that upon assembly, the bushing will have different spring rates in one radial direction than in the other. In this type of assembly, the relieved or channeled surface of the insert, when the outer insert is compressed between the outer and inner metal sleeves has a sleeve contact area which is considerably less than that of a standard insert. Therefore, axial or torsional stresses results in a larger stress per unit area at this contacting surface. Because of this greater stress, the advantages of the adhesives as herein described in such an application become readily apparent.

It should be understood that in carrying out the teaching of this invention, the entire contacting surface of the insert, or alternately only a portion thereof, can be bonded to the sleeve. The latter is especially applicable where the anticipated angular (axial and/or torsional) stresses are not too severe.

As a further embodiment of this invention, it is contemplated that the inner tubular sleeve may be replaced by a pin, which pin can be an integral part of the machine or apparatus on which the bushing is to be assembled. Likewise, the outer sleeve may be a housing in which the insert is compressed, which housing forms a portion of the vehicle, etc. Furthermore, these adhesive bonded bushings do not necessarily have to be cylindrical, but can be square, oval, polygonal or any other shape consistent with the use for which the bushing is intended.

The foregong description should serve as a clear and concise explanation of the invention and the method of carrying out the same, there being no intention of the same serving as a limitation. Said limitation is imposed only by the scope of the following claims in which, what is claimed is:

1. A resilient bushing comprising a plurality of rigid sleeves spaced apart from one another, and an elastomeric insert compressed between adjacent sleeves, and bonded thereto, the improvement comprising a multiple layer bonding medium including a first layer in contact with the sleeves and containing a halogenated rubber compound, and a second layer in contact with the insert and containing an oragnic diisocyanate and a halogenated nitrile rubber.

2. A bushing comprising a plurality of concentric spaced apart metal sleeves with an elastomeric insert compressibly bonded between adjacent sleeves, the improvement comprising a bonding medium for bonding each of said inserts to said sleeves comprising a chlorinated rubber in contact with the sleeves and an adhesive layer in contact with the surface of the elastomeric insert, said adhesive layer containing an organic diisocyanate and a chlorinated nitrile rubber.

3. A resilient bushing, especially adapted for high torsional and axial loads, composed of a plurality of concentric metal sleeves with elastomeric inserts compressibly disposed between and bonded to said sleeves, the improvement comprising a multiple layer bonding medium comprising a metal primer containing a chlorinated rubber and an adhesive in contact with the surface of the insert to be bonded to said metal sleeves, said adhesive containing a diisocyanate derivative of dialkoxy substituted benzidine and chlorinated acrylonitrile rubber.

4. A bushing according to claim 3 wherein the diisocyanate is 3,3'-dimethoxy benzidine diisocyanate.

5. A bushing adapted for a high axial or torsional loads comprising three concentric metal sleeves spaced apart from and axially displaced from one another, a rubber insert compressed between each of said sleeves and adhesively bonded thereto, the adhesive comprising a first layer in contact with the sleeves and containing a chlorinated rubber and a second layer in contact with the insert and containing a diisocyanate derivative of dimethoxy benzidine and chlorinated acrylonitrile rubber.

6. A method of bonding an elastomer under compression to metal comprising coating the surface of the metal with a primer containing a halogenated rubber, applying an adhesive layer containing an organic diisocyanate and a halogenated nitrile rubber over said primer coating, compressing the elastomer against the coated surface of the metal and heating at elevated temperatures to bond the elastomer to the metal.

7. A method of fabricating a bushing having a plurality of concentric spaced apart metal sleeves and a resilient elastomeric insert compressibly restrained between and bonded to the surfaces of the adjacent sleeves comprising:
  (A) cleaning the contacting surfaces of the metal sleeves,
  (B) applying a primer thereto, said primer containing a halogenated rubber in a liquid carrier,
  (C) drying the primer thereon,
  (D) applying an adhesive containing an organic diisocyanate and a chlorinated nitrile rubber in a liquid carrier over the primer,
  (E) drying the adhesive layer,
  (F) compressibly assembling each insert between adjacent metal sleeves, and
  (G) heating the assembly to adhesively bond each insert to said adjacent sleeves.

8. A method of fabricating a bushing having a plurality of spaced apart concentric metal sleeves and a resilient rubber insert compressibly held between each of said adjacent sleeves comprising:
  (A) sand blasting and degreasing the insert contacting surfaces of the sleeves,
  (B) applying a primer, containing a chlorinated rubber in a carrier, to said cleaned surfaces,
  (C) removing said carrier from said surface by evaporation,
  (D) applying an adhesive containing an organic diisocyanate and a chlorinated nitrile rubber in a liquid carrier over the primer,
  (E) drying said adhesive by evaporating the adhesive carrier,
  (F) assembling each insert between adjacent metal sleeves using a suitable lubricant, and
  (G) heating the assembly to a temperature of between about 260 and about 300° F. for a period of time sufficient to adhesively bond each insert to the metal sleeves in contact therewith.

9. A method according to claim 8 wherein the diisocyanate is 3,3'-dimethoxy benzidine diisocyanate.

10. A method according to claim 9 wherein the carrier for the primer comprises a solvent system containing a ketone and an ether.

11. A method according to claim 10 wherein the carrier for the adhesive consists primarily of xylene and trichloroethylene.

References Cited

UNITED STATES PATENTS

| | | | |
|---|---|---|---|
| 2,572,160 | 10/1951 | Kelly et al. | 287—85 |
| 2,572,215 | 10/1951 | Swart | 287—85 |
| 2,581,920 | 1/1952 | Kuhn | 161—218 X |
| 2,653,884 | 9/1953 | Hussey et al. | 161—254 X |
| 2,689,755 | 9/1954 | Krotz | 267—57.1 X |
| 2,850,424 | 9/1958 | Finelli et al. | 161—190 X |
| 2,900,292 | 8/1959 | Coleman et al. | 161—218 X |
| 2,905,582 | 9/1959 | Coleman et al. | 156—310 |
| 2,940,785 | 6/1960 | Haushalter | 267—57.1 X |
| 3,042,394 | 7/1962 | Bliss | 287—85 X |
| 3,082,999 | 3/1963 | Wolf et al. | 267—63 X |
| 3,147,963 | 9/1964 | Frazier | 287—85 X |
| 3,147,964 | 9/1964 | Wolf | 267—63 |
| 3,182,986 | 5/1965 | Brockman | 267—54 X |

EARL M. BERGERT, *Primary Examiner.*

HAROLD ANSHER, *Examiner.*